(12) United States Patent
Chang (10) Patent No.: US 9,065,591 B2
(45) Date of Patent: *Jun. 23, 2015

(54) METHODS AND APPARATUS FOR POLARIZATION DIVERSITY WITH PORTABLE DEVICES VIA WAVEFRONT MUXING TECHNIQUES

(71) Applicant: SPATIAL DIGITAL SYSTEMS, INC., Camarillo, CA (US)

(72) Inventor: Donald C. D. Chang, Thousand Oaks, CA (US)

(73) Assignee: Spatial Digital Systems, Inc., Camarillo ( * ) Notice: Subject to any disclaimer, the term of this patent is extended or adjusted under 35 U.S.C. 154(b) by 0 days.

This patent is subject to a terminal disclaimer.

(21) Appl. No.: 14/484,294

(22) Filed: Sep. 12, 2014

(65) Prior Publication Data

US 2015/0003830 A1    Jan. 1, 2015

Related U.S. Application Data

(63) Continuation of application No. 13/231,681, filed on Sep. 13, 2011, now Pat. No. 8,862,050.

(51) Int. Cl.
| | |
|---|---|
| *H04B 7/185* | (2006.01) |
| *H04J 14/06* | (2006.01) |
| *H04B 7/10* | (2006.01) |
| *H04W 72/04* | (2009.01) |

(52) U.S. Cl.
CPC . *H04J 14/06* (2013.01); *H04B 7/10* (2013.01); *H04W 72/0446* (2013.01)

(58) Field of Classification Search
CPC ............ H04B 7/10; H04B 7/145; H04B 7/15; H04J 14/06

USPC ............ 455/501, 63.1, 67.16, 101, 102, 105, 455/108, 12.1, 13.1, 13.2, 7, 11.1
See application file for complete search history.

(56) References Cited

U.S. PATENT DOCUMENTS

| | | | |
|---|---|---|---|
| 8,098,612 B2 | 1/2012 | Chang | |
| 8,111,646 B1 | 2/2012 | Chang | |
| 8,538,326 B2 * | 9/2013 | Chang | ............ 455/12.1 |

(Continued)

OTHER PUBLICATIONS

Prasad, R.; "OFDM for Wireless communications systems" (Google ebooks); Artech House; 2004.
Jiang, M.; "Multi-user MIMO-OFDM for Next-Generation Wireless Systems;" Proceedings of the IEEE, vol. 95; Jul. 7, 2007.

(Continued)

*Primary Examiner* — Tuan Pham (57) ABSTRACT

A novel terrestrial wireless communications technique for terrestrial portable terminals including hand-held mobile devices and fixed wireless instruments, utilizing a spoke-and-hub communications system, having a plurality of individual hubs and/or base-stations all in communications with the portable terminals. The portable terminals and the hubs are assigned to use incompatible polarity formats in terms of circularly polarity (CP) and linearly polarity (LP). In forward links, a signal processed by the LP ground telecommunications hubs is radiated through multiple antennas with various LP polarities to an individual CP user simultaneously. The multiple paths are organized via assignments of a plurality of polarities, frequency slots, and directions by wavefront multiplexing/demultiplexing techniques such that the same communications assets including frequency spectrum may be re-used by other users. The same polarity diversity methods can be extended to peer-to-peer communications.

20 Claims, 10 Drawing Sheets

Accessing LP hubs via CP terminals

(56) References Cited

U.S. PATENT DOCUMENTS

| | | | |
|---|---|---|---|
| 8,862,050 B2* | 10/2014 | Chang | 455/12.1 |
| 2008/0291864 A1* | 11/2008 | Chang | 370/316 |
| 2009/0170429 A1* | 7/2009 | Karabinis | 455/12.1 |
| 2011/0197740 A1 | 8/2011 | Chang et al. | |
| 2011/0243562 A1* | 10/2011 | Jackson et al. | 398/65 |
| 2012/0028572 A1 | 2/2012 | Chang et al. | |

OTHER PUBLICATIONS

Chu, T. S.; Restoring the orthogonality of two polarizations in radio communications systems Bell Sys. Tech. J.; vol. 50; No. 9; pp. 3063-3069; Nov. 1971.

Sollenberger, N., Winters, J., Li. Y.; "MIMO-OFDM for wireless Communications: signal Detection with Enhanced Channel Estimation;" IEEE Trans. on Communication, vol. 50; No. 9; Sep. 2002.

* cited by examiner

FIG. 5A access LP Hubs via CP terminals

Wavefront (WF) muxing
via polarizations only $$\begin{bmatrix} x1 \\ x2 \end{bmatrix} = \begin{bmatrix} 1 & i \\ i & 1 \end{bmatrix} \begin{bmatrix} s1 \\ s2 \end{bmatrix}$$

511  512  513

510

Wavefront (WF) muxing
via both polarizations
and frequencies $$\begin{bmatrix} x1 \\ x2 \\ x3 \\ x4 \end{bmatrix} = \begin{bmatrix} 1 & i & 1 & 1 \\ i & 1 & i & -1 \\ 1 & i & -1 & -i \\ i & 1 & -i & -1 \end{bmatrix} \begin{bmatrix} s1 \\ s2 \\ s3 \\ s4 \end{bmatrix}$$

METHODS AND APPARATUS FOR POLARIZATION DIVERSITY WITH PORTABLE DEVICES VIA WAVEFRONT MUXING TECHNIQUES

RELATED APPLICATION DATA

This application is a continuation of application Ser. No. 13/231,681, filed Sep. 13, 2011, now pending,

BACKGROUND OF THE INVENTION

1. Field of the Invention

The present invention relates generally to a terrestrial communications system for mobile and portable devices, with possible applications in peer-to-peer communication systems. More specifically, the present invention relates to a spoke-and-hub communications system with increased user capacity by allowing frequency re-use through the use of multiple polarities, frequency slots, and directions organized through "unique waveforms" to radiate one signal.

2. Description of Related Art

Recent demand for terrestrial wireless communications methods such as WiFi and WiMax through portable devices such as iphones, ipods, bluetooth have increased dramatically. The increased use of such devices has resulted in a proliferation of IP-based products using fibers and satellites for back-bone or transport applications. On the other hand, high-speed access communications to handheld devices typically emanate from small wireless antennas that basically radiate and receive in broad beams with near omni-directional radiation patterns. Effective spectrum utilization becomes more and more important because of the expeditious increase of demand for wireless "access" communications.

Ever increasing demand for a finite amount of spectrum has made it one of the most important resources in wireless communications. Therefore, there have been schemes to increase spectrum utilization efficiency, such as orthogonal frequency-division multiplexing (OFDM) [1]-[3], cellular frequency reuse, and dual-polarization frequency reuse [4], [5]. OFDM is an attractive technique for digital transmission, as spectrum utilization efficiency can be increased by the orthogonal frequency spacing and signal bands' overlapping. Dual-polarization frequency reuse systems, which utilize both linear and circularly polarized electromagnetic (EM) waves that are orthogonal to each other, have been demonstrated in many satellite communications applications to double system capacity for fixed wireless (i.e. Wi-Fi, WiMax) and mobile (i.e. 3G and 4G systems for cell phones) systems. However, these polarization diversity systems are subject to system performance degradation due to cross polarizations and signal fading.

Linear-polarized (LP) systems feature two polarization directions of vertical polarity (VP) and horizontal polarity (HP). Similarly, circular-polarized systems also feature two polarization directions of right hand circular polarity (RHCP) and left hand circular polarity (LHCP).

In principle, transmission through orthogonal polarization carriers doubles the system capacity. However, practical use for portable devices is hard to achieve due to a user's dynamic motions, propagation impairments, antenna imperfections, among other things. The propagation impairments, such as rainfall attenuation, depolarization, and cross-polarization interference (CPI), deteriorate the signal transmission in the satellite-earth station links. Some compensation methods were reported in the literature [4]. Furthermore, the problems will become complicated by multipath fading effects when transmitting in a terrestrial environment. Although some schemes such as equalization and diversity are proposed to overcome such problems, their complicated nature prevents them from being a practical solution. The present invention aims to adopt the concept of wavefront multiplexing to more efficiently utilizing spectrum in polarization diversity.

Since the advent of low cost integrated Global Navigation Satellite Systems (GNSS) receivers such as the Global Positioning System (GPS) in addition to the usage of commercial off-the-shelf Micro-Electro-Mechanical Sensor (MEMS) accelerometers and gyroscopes, estimation of the "orientations" and motion trends of individual personal portable devices with respect to a fixed coordination system has become practical and affordable, as evidenced by their proliferation to the previously mentioned portable devices. GNSS and related technologies are satellite-based geo-location systems. There are other non-satellite based geo-location systems which may become cost effective, with small size, weight and power (SW&P) to be implemented in portable devices. The small-sized MEMS inertial measurement unit (IMU) provides the raw IMU data through a serial interface to a processor board where the inertial navigation solution and integrated GNSS/IMU with a Kalman filter is generated. Thus, polarizations diversity for better spectrum utility can be implemented with low cost and reliable processing techniques for consumer wireless communications markets, such as those featuring 3g and 4g mobile devices as well as WiFi and WiMax fixed devices.

Wavefront multiplexed frequency re-use methods via polarization diversity take advantage of incompatibilities among the two polarity formats (such as LP versus CP) to implement "orthogonality" among multiple waveforms used by different user signals that are sharing the same frequency assets. The conventional performance degradations such as cross polarizations of a CP waveform to a LP hub therefore become part of the WF muxed waveforms and operational features. The orthogonality among multiple user signals is no longer solely dependent on orientations of the portable user devices.

Compatible polarization configurations between user terminals and hub and/or cell tower assets are essential to efficient wireless links. It is generally true to efficiently utilizing polarization diversity that the LP polarized user terminals will use LP hubs and/or cell towers, and CP user terminals relay data via CP hubs and/or cell towers. When LP wireless portable terminals communicating to and from a CP hub and/or cell tower, their antenna polarizations must be configured accordingly emulating CP terminals, to prevent 3 dB SNR losses in receiving (Rx) functions on the one hand, and not to generate unwanted radiations in transmitting (Tx) functions on the other hand.

Our approaches to these issues are very different than those of polarization re-configuration, and may not require users to switch polarizations on their equipment at all. Linearly Polarized (LP) users can use their existing terminals to relay data to CP hubs and/or cell towers. There are no spectrum asset losses due to the incompatibility. It is how we re-organize the CP spectrum assets via operation of hubs and/or cell towers to make the "incompatibility" operationally possible. It is therefore a result of our invention that linearly polarized hubs or cell towers can be accessed and efficiently utilized by circularly polarized user terminals, and vice versa. We will illustrate how to use LP hubs to access CP portable devices efficiently in this application. It would be obvious that a person with ordinary skills in the art can derive similar techniques using CP hubs to access LP portable devices.

The invention relates to grouping two orthogonally polarized communications channels (e.g. HP and VP in linear polarities) with a common frequency slot on a hub or cell tower through Wave-Front (WF) Multiplexing (muxing) techniques for user portable terminals with incompatible polarization formats (e.g. RHCP and LHCP in circular polarities). The grouping method is extendable to multiple pairs of communications channels assets with both (LP) polarization formats with various frequency slots on different hubs or cell towers.

One of the approaches utilized by the present invention is the concept of virtual link, which utilizes N communications links organized by Wavefront (WF) Multiplexing (Muxing). A WF carrying a signal stream features a fixed spatial phase distribution among selected N parallel links, which support up to N orthogonal WFs carrying N independent signals concurrently from a source to a destination. The virtual link techniques are referred to as Orthogonal Wave-Front Diversity Multiplex (OWFDM), and the enabling signal structures as OWFDM waveforms.

Virtual links can also be applied for satellite communications transporting data within a fields of view common to selected transponders. Our proposed "Polarization Utility Waveforms" can successfully deliver signals via LP transponding satellites using CP ground terminals, and vice versa. They are engineered via techniques of signals spreading over multiple transponders. The waveforms may look like OFDM waveforms and may also appear as MIMO formats, but are not. They are subsets of OWFDM waveforms and may feature unique format interconnecting OFDM and MIMO through an orthogonal signal structure.

Virtual links can also be applied for terrestrial communications for last mile connectivity as well as transporting means from N sources to M destinations. Our proposed "Polarization Utility Waveforms" can successfully uploading signals to CP hubs and/or cell towers using LP portable devices terminals, and vice versa. They are engineered via techniques of signals spreading over multiple communications channels in the selected hubs and/or cell towers. The waveforms may look like OFDM waveforms and also appear as MIMO formats, but they are not.

It can be shown that WF muxing/demuxing techniques are powerful tools for path length equalizations among parallel paths/channels. SDS has applied these techniques for various applications; (1) Power combining from multiple transponders from the same satellites and/or different transponding satellites [6], (2) back channel equalization for ground based beam forming process in satellite applications [7], and (3) Distributed data storage [8].

Uniqueness of the OWFDM

Unlike OFDM for commercial wireless communications which feature waveforms with multiple orthogonal sub-carriers uniformly distributed in a frequency band, our proposed OWFDM techniques will spread transmitting (Tx) signals into multiple channels with a unique phase distribution pattern, referred to as a wavefront (WF). These channels may be assigned to different frequency slots, time slices, polarizations, and/or directions when these "communications assets" become available. The selected multi-dimensional waveforms may be dynamic and reconfigurable. There will always be embedded pilot signal streams through the same propagating paths but distributed in phase distribution patterns orthogonal to the one which carries the desired signal stream.

In general, the OWFDM waveforms must meet existing polarization and frequency convention restrictions. At a portable device, transmitting (Tx) signals may be preprocessed by a WF multiplexer (muxer), which coherently spread signals into multiple channels concurrently in a form of orthogonal structure in a selected N-dimensional domain. The generated orthogonality is among multiple wavefronts (WFs). With N parallel propagating channels, there are N-orthogonal WFs available. Probing signal streams may be attached to at least one of them. The remaining WFs are available for various Tx signal streams.

Signals that originate from a portable device propagating through various uplink carriers/paths, and arriving at designated hubs and/or cell towers feature differential phase delays, Doppler drifts, and amplitude amplifications/attenuations.

Post processing implemented at receiving (Rx) site will equalize the differential phase delays, frequency drifts and amplitude attenuations among signals through propagating paths. Calibrations and equalizations take advantages of embedded probe signals and iterative optimization loops. There are not feedbacks required through back channels, As a result of equalizations, the Rx WFs become orthogonal, and the attached signals streams are then precisely reconstituted by the WF demuxer.

SUMMARY OF THE INVENTION

The present invention pertains to a set of waveforms taking advantage of polarization incompatibilities between CP and LP signals, allowing portable devices to access available hub (and/or cell tower) communications assets when user portable or fixed terminals are not polarization-compatible. We will present the operational concepts and associated mechanisms to allow CP user terminals to access LP spectrum assets in hubs and/or cell towers (as well as LP user terminals to access CP spectrum assets) without sacrificing spectrum utility efficiencies and capacity.

The Wavefront multiplexed (WF muxed) polarization diversity methods as described with the present invention may be utilized for peer-to-peer communications to enhance capacity so long as user terminals on both ends of a link are not compatible in polarization formats. For example, when a transmitting device on a Bluetooth link uses a RHCP format, the device on the receiving side of the Bluetooth link will use both HP and VP (two components of LP format). The same transmitting device may use both RHCP and LHCP, therefore capturing additional 100% channel capacity and delivering 100% more data to the receiving side using the polarization diversity methods as described with the present invention.

Additionally, special OWFM waveforms are constructed under the constraints that all the user terminals feature only one of the two available CP options, while the hub and/or cell tower spectrum assets feature both LP channels of separated transceivers (transmitters and receivers) in a hub and/or cell tower. As a result, the targeted LP hub and/or cell tower spectrum assets support not only regular LP users but also additional CP customers without power and bandwidth capacity loss due to the polarization incompatibility.

Additional benefits include providing for dynamic resource allocation capability such as downlink power, or equivalently D/L EIRP (equivalent isotropically radiated power). Various user frequency channels in different transceivers are grouped and utilized by multiple users via OWFDM. The combined "power" assets can be dynamically assigned to any of the users as long as the total power output is constant. Current systems allow for two independent CP users to access conventional 100 mW CP channels separately, with the constraint that each user may only draw a maximum of 100 mW. However, with the present invention, when the same users access 100 mW LP channels organized by OWFDM, the first user may draw 160 mW while the second user may only need to draw 40 mW. Dynamic power requirements may mean that the first user no longer needs to transmit, allowing the second user to effectively use all 200 mW of equivalent power, or a 3 dB gain on equivalent EIRP.

These and other features of the present invention will become apparent from the following description of the invention, when viewed in accordance with the accompanied drawings and appended claims.

REFERENCES

1. Ramjee Prasad, "OFDM for wireless communications systems" (Google eBook) Artech House, 2004
2. Ming Jiang, "Multiuser MIMO-OFDM for Next-Generation Wireless Systems," Proceedings of the IEEE, Volume: 95 Issue: 7 Jul. 2007
3. Ye G. Li, Jack H. Winters, and Nelson R. Sollenberger, "MIMO-OFDM for Wireless Communications: Signal Detection with Enhanced Channel Estimation," IEEE Trans. On Communications, vol. 50, no. 9, September 2002
4. T. S. Chu, "Restoring the orthogonality of two polarizations in radio communication systems I," *Bell Syst. Tech. J.*, vol. 50, no. 9, pp. 3063-3069, November 1971.
5. U.S. patent application Ser. No. 12/847,997; "Polarization Re-alignment for Mobile Satellite Terminals," by Frank Lu, Yulan Sun, and Donald C. D. Chang; Filing on Jul. 30, 2010.
6. U.S. patent application Ser. No. 12/462,145; "Communication System for Dynamically Combining Power from a Plaurality of Propagation Channels in order to Improve Power Levels of Transmitted Signals without Affecting Receiver and Propagation Segments," by D. Chang, initial filing on Jul. 30, 2009.
7. U.S. patent application Ser. No. 12/122,462; "Apparatus and Method for Remote Beam Forming for Satellite Broadcasting Systems," by Donald C. D. Chang; initial filing May 16, 2008
8. U.S. patent application Ser. No. 12/848,953. "Novel Karaoke and Multi-Channel Data Recording/Transmission Techniques via Wavefront Multiplexing and Demultiplexing," by Donald C. D. Chang, and Steve Chen Initial Filing on Aug. 2, 2010

BRIEF DESCRIPTION OF THE DRAWINGS

FIG. 5A depicts two mathematic matrixes: a 2-to-2 wavefront muxing matrix for two signals processing and a 4-to-4 mathematic matrix. The symmetric 2-to-2 matrix is constructed under the constraints that support user terminals featuring only one of the two available CPs. The symmetric 4-to-4 matrix is constructed under the constraints that support user terminals featuring only one of the two available CPs but with both frequency slots. However, there are many different applicable combinations of various users sharing the resources via the "matrixes". For instance, the symmetric 2-to-2 matrix is applicable for a user terminal featuring both two CPs with doubled channel capacity. Similarly the symmetric 4-to-4 matrix is also applicable to a user terminal featuring both two CPs and two frequency slots for quadrupled channel capacity. These two matrixes are functional mechanisms for wavefront multiplexing and de-multiplexing.

DETAILED DESCRIPTION OF THE PREFERRED EMBODIMENT

Figure 1:
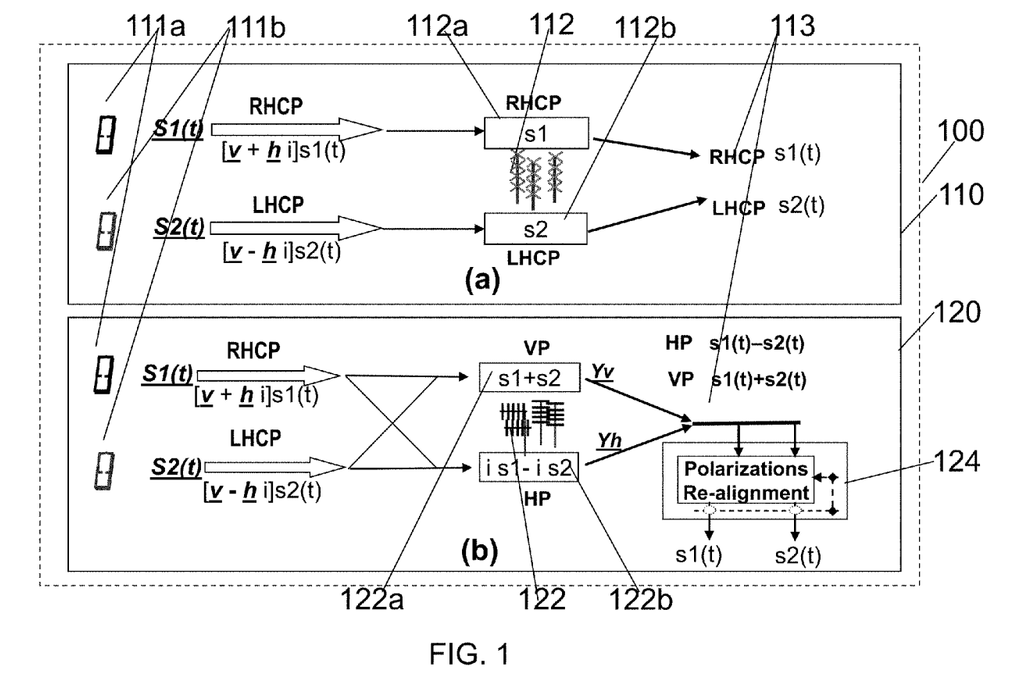
FIG. 1 depicts a block diagram of a LP hub accessed by two CP terminals for independent data stream relay to terrestrial communications networks. It also displays return-links from two users to a hub.

FIG. 1 100 illustrates particular embodiments of our proposed techniques, assuming that portable CP terminals are within a common field-of-view of both hubs. The terminals are return-links (RL) examples depicting communications from 2 portable devices to a hub.

Panel (a) 110 illustrates a conventional technique for accessing a CP communications hub asset 112 via CP terminals 111*a* and 111*b*. Terminals 111*a* and 2 111*b* relay independent data streams s1(t) and s2(t) to CP hub 112. Terminal 1 111a in right-hand circularly-polarized (RHCP) waveforms is allocated for RHCP channel 112a at frequency slot "fo" on the CP hub. Similarly, terminal 2 111b in left-hand circularly-polarized (LHCP) waveforms is allocated for second CP channel 112b at the same frequency slot "fo" but in LHCP on the hub. As a result, s1(t) goes through a RHCP active channel while s2(t) is independently conditioned by another active channel in LHCP. The "active channel" performs low-noise amplifications, proper filtering processing, frequency translations, etc. Hub receiving processor 113 will receive both s1(t) and s2(t) independently through two separated antenna ports: s1(t) from a RHCP and s2(t) a LHCP port.

Panel (b) 120 depicts an operational scenario where CP terminals 111 relay data through LP hub 122. Specifically, active LP channels 122a and 122b are used in the LP hub. 1 HP and 1 VP channels are on a common frequency slot.

Mathematically, we select a set of 2-dimensional orthogonal Wave-Front (WF) vectors, [1, i] and [1, −i], to match the signal structures of polarizers for RHCP and LHCP signals. The 2-to-2 WF muxers and demuxers are implemented by analog polarizers in RF instead of 2-to-2 FFT digital processors, such that $$S1(t)=[v+h\ i]s1(t) \quad (1a)$$

$$S2(t)=[v-h\ i]s2(t) \quad (1b)$$

S1 is radiated by terminal 1 111a in RHCP while S2 by terminal 2 111b is in LHCP format. Equivalently, S1 in RHCP is transmitted in both HP and VP with a fixed phase distribution, in that the phase in HP is always 90° ahead of that in VP.

As the S1 signals in RHCP arrive at selected LP hub 122, both VP and HP components will be picked up "concurrently" by two LP channels at a common frequency slot. As depicted, one is in VP 122a and the other in HP 122b active channel.

Similarly S2 is also concurrently transmitted in both HP and VP with a fixed phase distribution, in that the phase in HP is always 90° behind that in VP. As the S2 signals in LHCP arrive at selected LP hub 122, both VP and HP components will be picked up "concurrently" by two LP active channels. As depicted, one in VP 122a and the other in HP 122b.

Each LP channel is occupied by an aggregated signal stream consisting of two concurrent, independent signals s1 and s2. A caveat is that s1 and s2 cannot be seperated from the associated aggregatted signal stream as they are not multiplexed by code, time, or frequency. Rather, there are special relationships, also called "wavefronts" (WFs) between the two s1 signals in both LP channels, with something similar for s2 signals. s1 and s2 can be separated and recovered with both aggregated signals from the LP channels are processed simultaneously. The two signals are therefore multiplexed spatially while propagating through both paths.

The conditioned signals by VP channel 112a and HP channel 122b are designated as Yh (t) and Yv(t) respectively. The amplitude attentuations and phased delays due to propagation and electronics for the HP and VP paths are identified as (Ah and Av) and (α and β) respectively, where $$Yv(t)=s1(t)+s2(t) \quad (1a)$$

$$Yh(t)=i[s1(t)-s2(t)] \quad (1b)$$

As the signals arrive at a LP hub 112, polarization alignment processor 124 and a RF polarizer from a Rx CP antenna will serve as the WF demuxer functions, where the two concurrent CP antenna outputs will be:

$$Z\ rhcp(t)=[Av\exp(j\alpha)*Yv(t)-i\ Ah\exp(j\beta)*Yh(t)]/2 \quad (2a)$$

$$Z\ lhcp(t)=[Av\exp(j\alpha)*Yv(t)+i\ Ah\exp(j\beta)Yh(t)]/2 \quad (2b)$$

Furthermore, in terms of s1 and s2 Equation (1) can be re-written as $$\begin{aligned} Z\ rhcp(t) &= [Av\ \exp(j\alpha)*(s1+s2)-i\ Ah\ \exp(j\beta)*(i\ s1-i\ s2)]/2 \\ &= s1[Av\ \exp(j\alpha)+Ah\ \exp(j\beta)]/2+ \\ &\quad s2[Av\ \exp(j\alpha)-Ah\ \exp(j\beta)]/2, \end{aligned} \quad (3a)$$

$$\begin{aligned} Z\ lhcp(t) &= \left[Av\ \exp(j\alpha)*(s1+s2)Yv(t)+i\ Ah\ \exp(j\beta)\begin{pmatrix} i\ s1- \\ i\ s2 \end{pmatrix}\right]/2 \\ &= s1[Av\ \exp(j\alpha)-Ah\ \exp(j\beta)]/2+ \\ &\quad s2[Av\ \exp(j\alpha)+Ah\ \exp(j\beta)]/2. \end{aligned} \quad (3b)$$

In general, the two wavefronts will not be orthogonal when they arrive at polarization alignment processor 124. Diagnostic and compensation circuits (not shown) are present for amplitude and phase differential adjustment among the HP and VP paths. As the amplitude and phase effects of the two paths are equalized, the WFs regain orthogonality, wherein the associated signals can then be precisely reconstituted.

For hub operators, the LP hub assets (RF power and frequency bandwidth) from channels 122a and 122b are grouped together and shared by two seperated users via unique orthogonal waveforms which happen to be conventional RHCP and LHCP. Each LP channel "serves" only one of the aggregated wavefront components (wfc). It always takes two components to reconstruct relayed signals It should be noted that the linear channels need not be from the same hub. There may be situations that call for LP hubs to cover the same service areas.

Figure 2A:
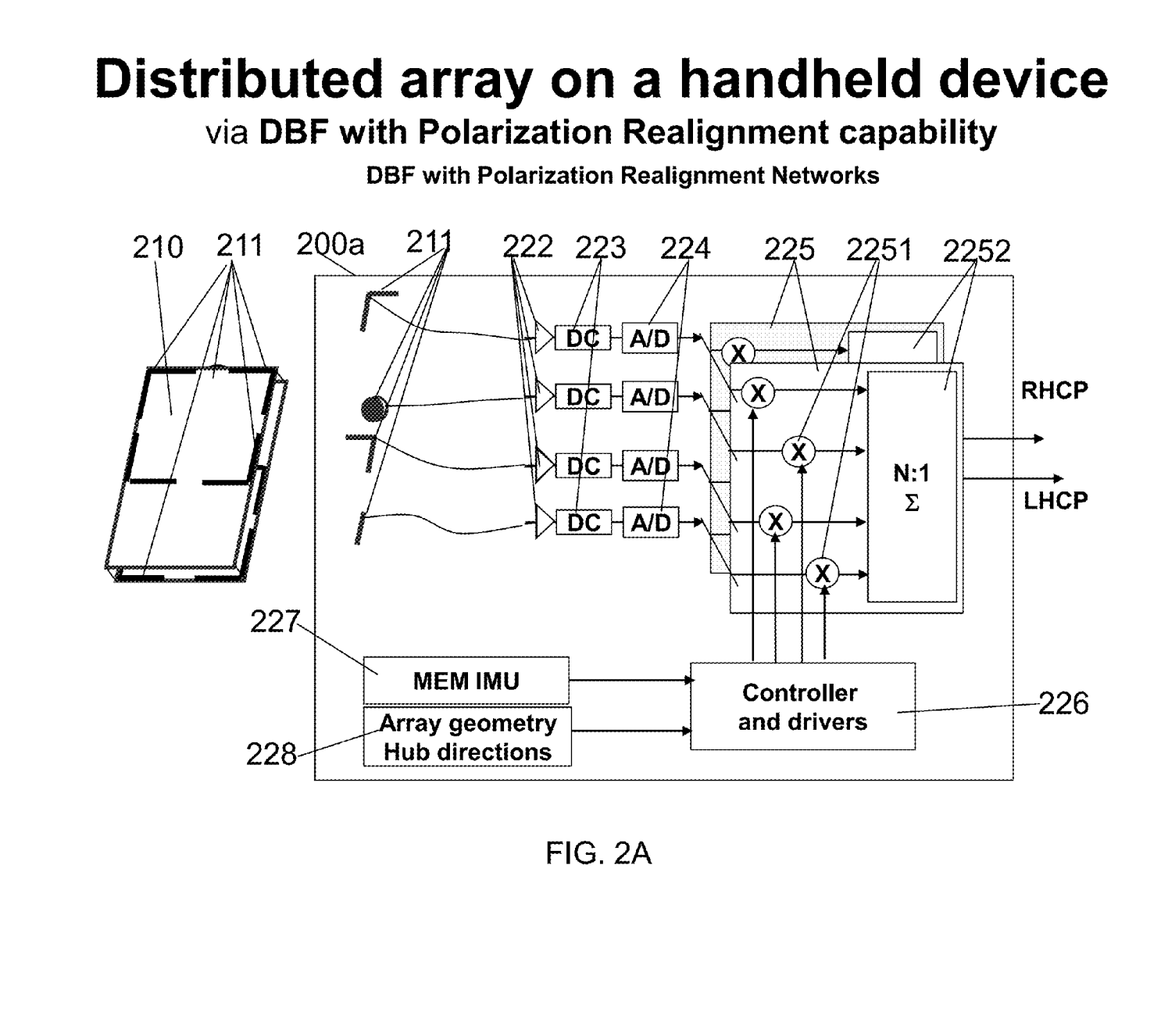
FIG. 2A depicts a handheld device in a receiving mode with a digital beam forming (DBF) process capable of performing dynamic polarization realignment, which is based on the knowledge of orientation and location of the handheld device and potential hub locations with respect to common local fixed coordinates.

FIG. 2A 200a depicts a receiving beam-forming block diagram for portable device 210 with receiving/radiating elements 211 distributed as depicted. Signals received by elements 211 are conditioned (amplified, and filtered) by LNAs (low noise amplifiers) 222, frequency down-converted by down converters 223, then digitized by A/Ds (analog-to-digital converters) 224 before processing via digital beam forming (DBF) networks 225. DBF processors 225 dynamically generate two CP beams, one in RHCP and one in LHCP. DBF 225 performs weighted summations of all received signals captured by N individual elements, where N is an integer and N>2. Complex weightings are then performed by N complex digital multipliers 2251, with the summing via digital combiners 2252. The multiplicands are the N captured received signals and the multipliers are beam weight vectors (BWV), of which the components feature complex parameters dynamically controlled by controller 226 based on the knowledge of the device current positions and orientation with respect to the designated hubs locations and orientations. The data is gained from embedded inertial reference devices such as MEM IMU 227, and other stored information 228 such as array geometries of the remote device, the directions of intended hubs, etc. The controller will "calculate" or "derive" the proper BWV such that the composite receiving patterns from distributed array 211 will feature adequate antenna gains and excellent polarization orientations toward the intended base-stations or communications hubs.

Additional circuits (not shown) may be added to enhance the polarization isolations between the RHCP and LHCP channels. The additional diagnostic circuits may be based on correlations between RHCP and LHCP assuming these are completely independent and therefore completely uncorrelated. An optimization loop may be incorporated as one of the drivers for altering the two sets of BWVs. The optimization goals are to minimize the cross-correlations between RHCP and LHCP channels.

Figure 2B:
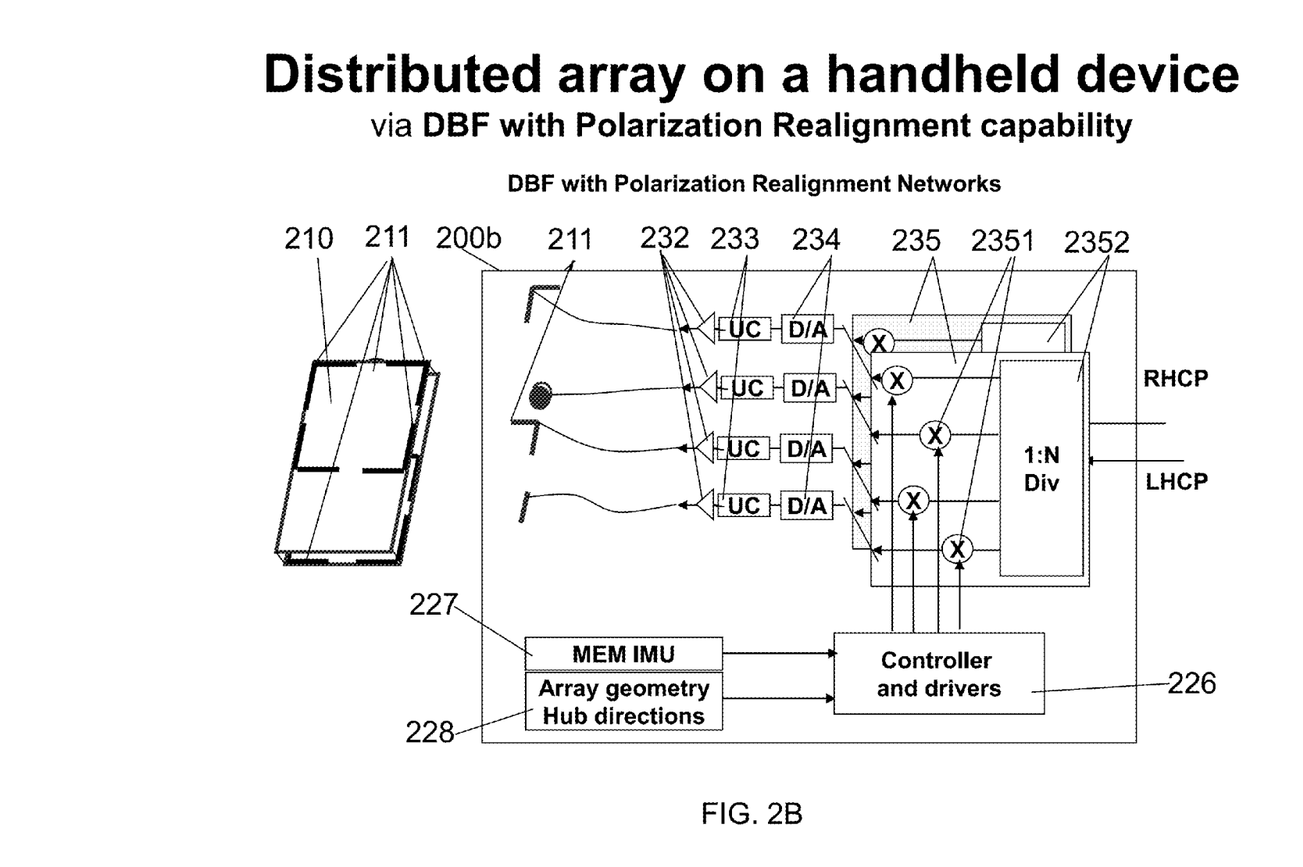
FIG. 2B illustrates a handheld device in a transmitting mode with a digital beam forming (DBF) process capable of performing dynamic polarization realignment, which is based on the knowledge of orientation and location of the handheld device and potential hub locations with respect to common local fixed coordinates.

FIG. 2B 200b depicts a transmitting beam-forming block diagram for portable device 210, with receiving/radiating elements 211 distributed as depicted. The transmitting signals are sent to transmitting digital beam forming (DBF) networks 235, dynamically generating two CP beams for the N-element distributed arrays, one in RHCP and the other LHCP, where N is an integer and N>2. DBF functions 235 for a CP beam perform signal replications by first re-generating N-identical components, and then weight replicating streams individually by N components of a BWV. The weighted N signals from the RHCP DBF and those from the LHCP DBF for individual radiating elements are summed together before conversion to analogue format by D/As 234, frequency up-converted by up-converters 233 and power amplified by power-amplifiers 232 before being radiated individually to free space by distributed array elements 211. The complex weightings are performed by N complex digital multipliers 2351 and the duplications are via digital replicators 2352. The multiplicands are the N captured received signals and the multipliers are the beam weight vectors (BWV). The components featuring complex parameters that are dynamically controlled by controller 226 are based on the knowledge of the device's current positions and orientations with respect to the designated hubs locations and orientations. This knowledge is derived from embedded inertial reference devices 227, and other stored information 228 such as array geometries of the remote device, and the directions of intended hubs. The controller will "calculate" and/or "derive" the proper BWV such that the composite receiving patterns from the distributed array 211 will feature adequate antenna gains and excellent polarization orientations toward the intended base-stations or communications hubs.

Figure 3:
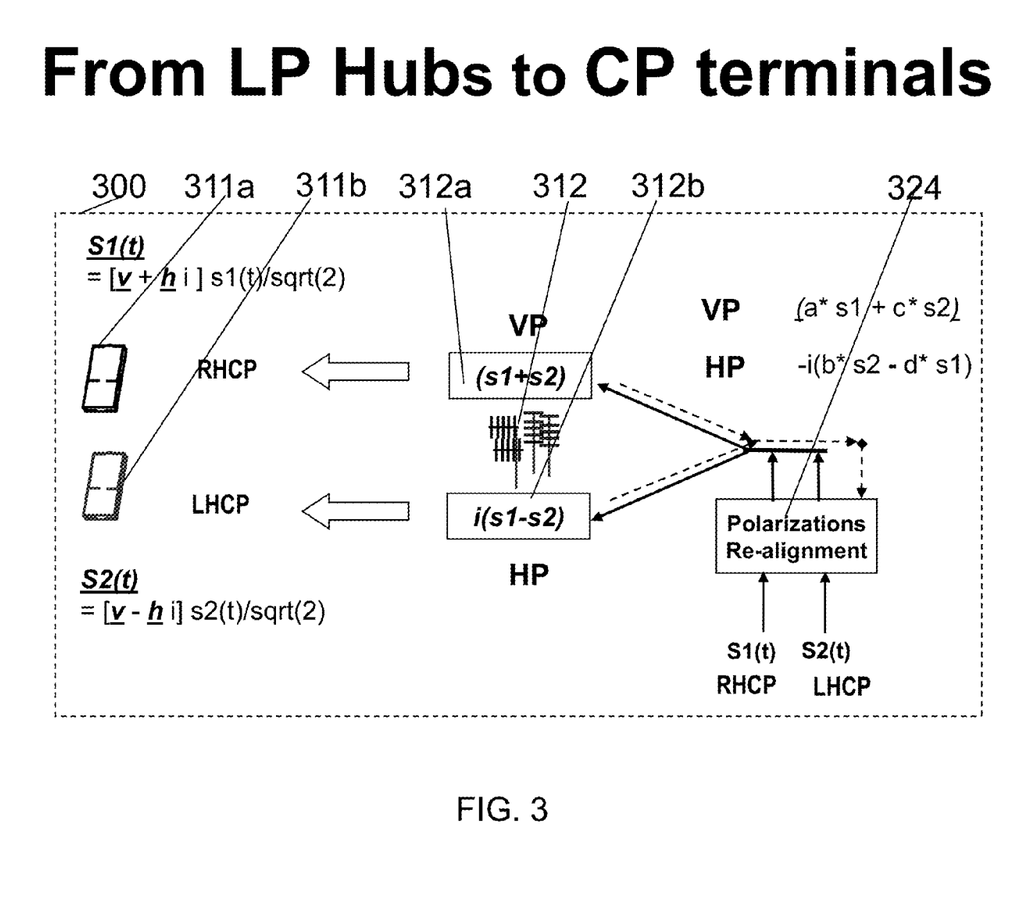
FIG. 3 illustrates the corresponding forward links for the two users in FIG. 1.

FIG. 3 300 depicts the same scenario as that in FIG. 1, except it is for "forward links" communications flows from a LP hub 312 to CP remotes 311. A preprocessing unit 324 in the hub is used to "pre-compensate" for the amplitude and phase differentials among the two LP propagation paths. Signals in the corresponding forward-link channels for terminal-1 311a and terminal-2 311b are available locally at the source location 312. These signals can be used as feedback for the pre-compensation processing 324.

Figure 4:
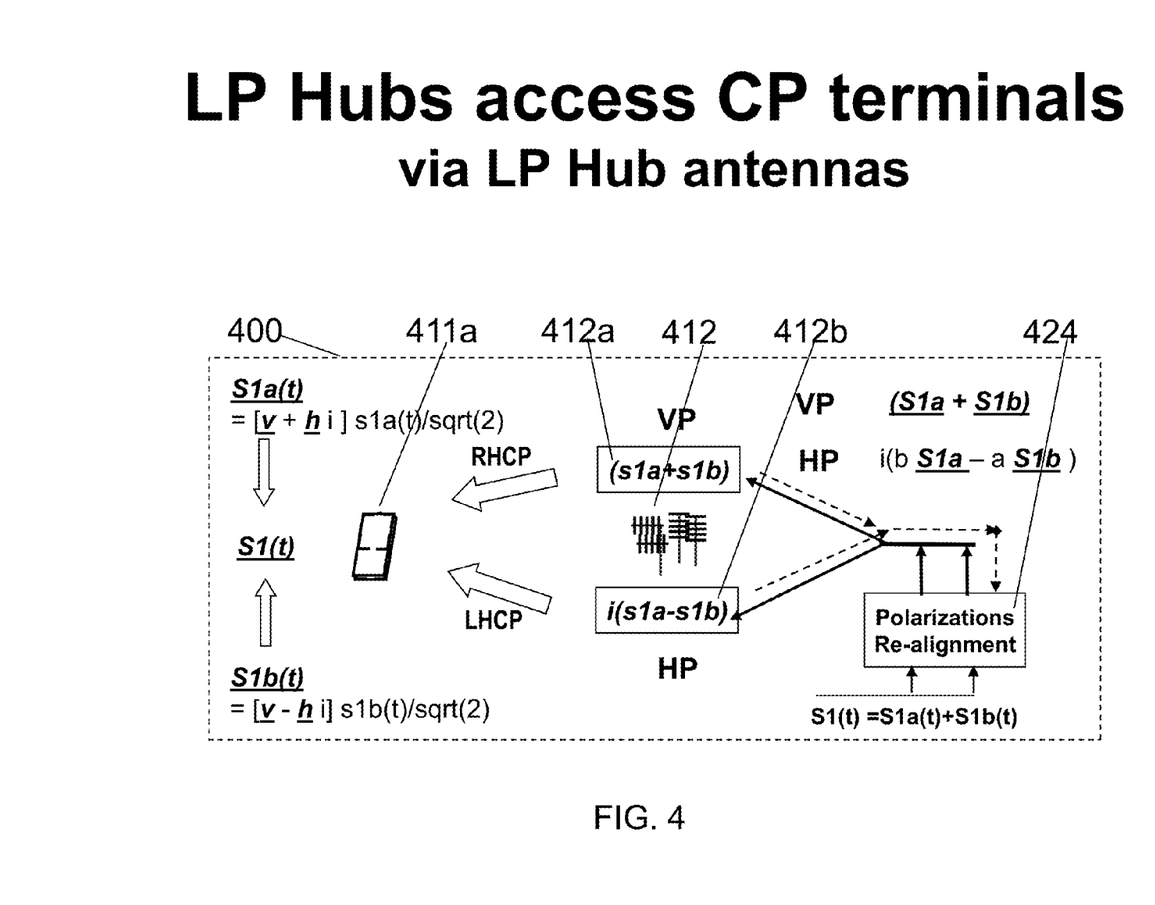
FIG. 4 illustrates the corresponding forward links for one user in FIG. 1 but utilizing both RHCP and LHCP.

FIG. 4 400 depicts the similar scenario as that in FIG. 3 in that both are for "forward links" communications flows. FIG. 4 400 depicts flow from LP hub 412 to CP remotes 411. LP hub 412 must feature both HP and VP polarization transmission functions. The desired signals to the first remote terminal s1(t) is decomposed into two sub streams s1a(t) and s1b(t). The decomposition process may be a 2-to-2 FFT or a 1-to-2 TDM demuxing switch. Pre-processor 424 performs two linear combinations, combining s1a (the first signals stream for terminal-1 411a), and s1b (the second signals stream also for terminal-1 411a). The weightings among the two linear combinations are for generating two equivalent CP signals at anticipated destinations 411, and shall include effects from propagations and unbalanced electronics. Signals in both forward-link channels for terminal-1 are available locally at the source location 412. These signals will be used as feedback to optimize the pre-compensation processing 424. At the destination, the first remote terminal 411a will re-combine the two received substreams s1a(t) and s1b(t) into the reconstituted signal stream s1(t).

Figure 5A:
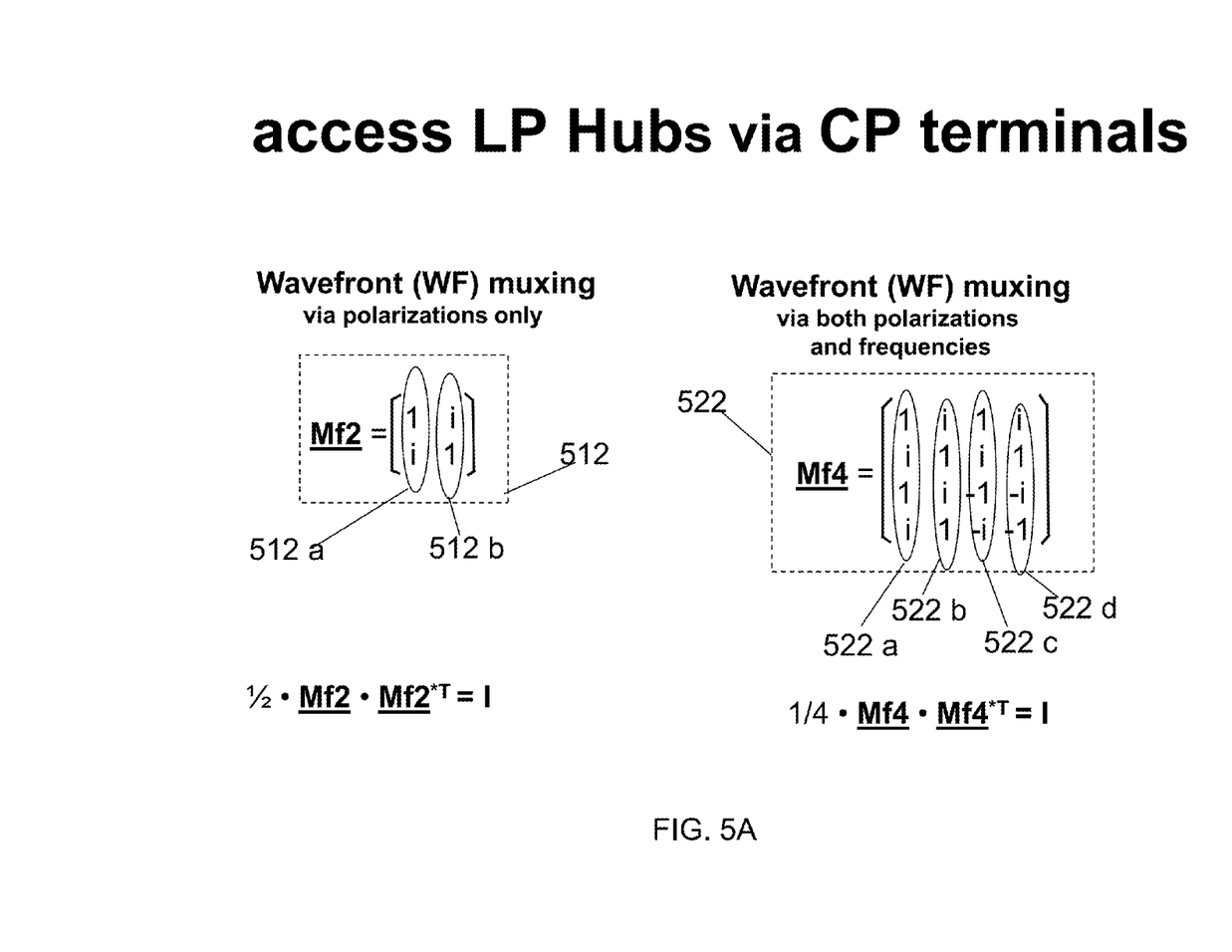
FIG. 5B depicts the two mathematic matrix equations converting CP signals into LP channels as they are captured by a LP hub. The differential propagation effects are not included. The one on the left represents the conversions of two CP signals, s1 in RHCP and s2 in LHCP, into two aggregated LP signals in an HP and a VP channel. The one on the right is a 4-to-4 mathematic matrix equation representing signal conversions in four LP channels; two in HP and two in VP at two common frequency slots. The symmetric matrix is constructed under the constraints that can support user terminals featuring only one of the two available CPs but with both frequency slots.
FIG. 5C illustrates a simplified block diagram of a LP hub accessed by four CP terminals for independent data stream relay back to the hub station utilizing the same matrix conversion assumptions in FIG. 5B. It also displays return-links from the four users to a hub. The architecture is constructed under the constraints that support user terminals featuring only one of the two available CPs but with both frequency slots.
FIG. 5D depicts a simplified block diagram for implementation of technique as shown in FIG. 5C. The WF muxing are for CP to LP conversions. Standard low-noise amplifiers (LNAs) and high power amplifiers (HPAs) are not shown. Diagnostic signals (pilots) are embedded for phase and amplitude differential equalization among multiple paths for orthogonal WF reconstructions. WF demuxing is used to separate the signals from two portable devices.

FIG. 5A depicts wavefront multiplexing matrixes 512 and 522 for CP user terminals to access multiple communications channels in LP hubs. 2-by-2 matrix 512 is for conversion of two independent CP signals (one at RHCP 512a and the other at LHCP 512b) into two signal streams in LP (one in HP and the other in VP). All the signal streams (two inputs and two outputs) are at same frequency slot f1.

Similarly, 4-by-4 matrix 522 on the right converts 4 independent CP signals (two at RHCP 522a and 522c and the other two at LHCP 522b and 522d). As a result, an input stream is replicated in every output stream, and each output stream consists of all input streams.

Figure 5B:
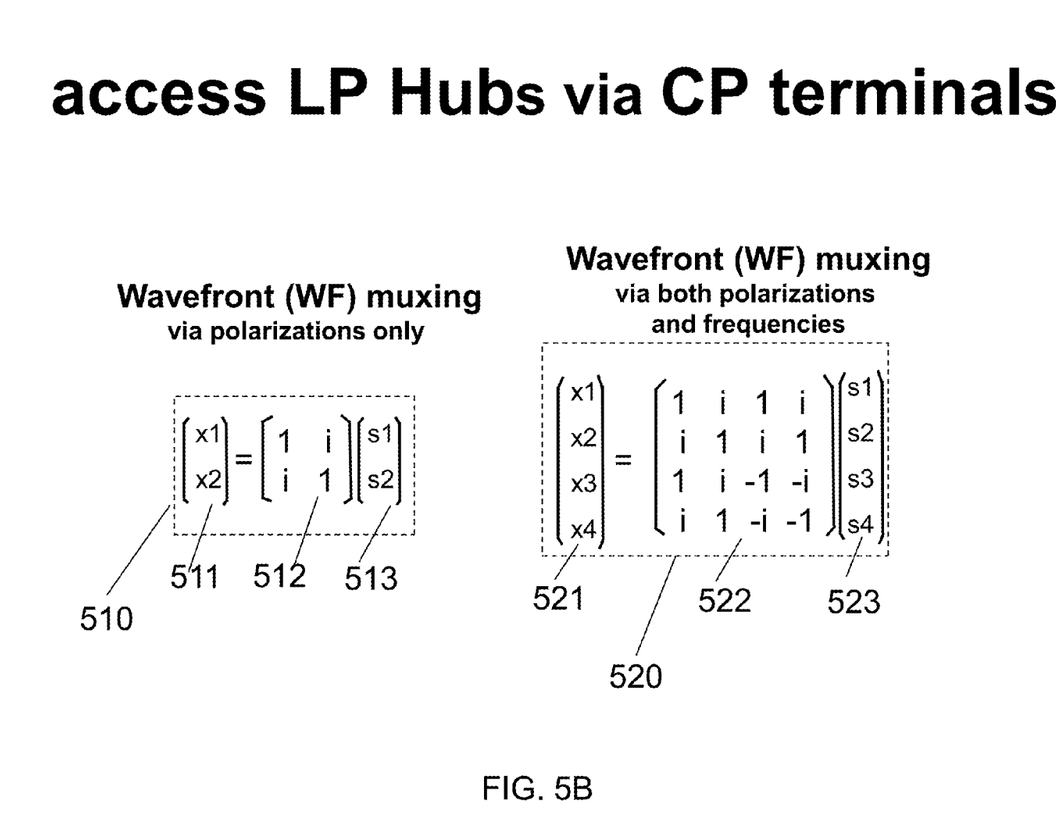

FIG. 5B depicts the mathematic matrix equations 510 and 520 for conversion of CP signals into LP channels as they are captured by an LP satellite. The differential propagation effects are not included. 2-by-2 matrix equation 510 represents the conversions of two CP signals 513, s1 in RHCP and s2 in LHCP, into two aggregated LP signals 511 in an HP and a VP channels in a LP hub. The symmetrical conversion matrix 512 is the WF muxing processor and is referred as Mf2.

$$\underline{Mf2} = \begin{bmatrix} 1 & i \\ i & 1 \end{bmatrix} \quad (4a)$$

It should be noted that Mf2 can be used to convert two CP signals into two LP signals, and can also convert two LP signals into two CP signals. Furthermore, $$\tfrac{1}{2} \cdot Mf2 \cdot Mf2^{*T} = I \quad (4b)$$

Mf2 can be used as a WF muxer and its corresponding WF demuxer will be Mf2*^T. The two resulting wavefronts (WFs) 512a and 512b as depicted in FIG. 5A are orthogonal to each other.

Matrix equation 520 is a 4-by-4 mathematic matrix equation representing signal conversions from 4 CP signals 523 in four LP channels 521 of a communications hub, where two in HP and two in VP are at two identical frequency slots. Symmetric matrix 522 is constructed under the constraints that all the user terminals feature only one of the two available CPs but with both frequency slots.

The symmetrical conversion matrix 522 is the WF muxing processor and is referred as Mf4.

$$\underline{Mf4} = \begin{bmatrix} 1 & i & 1 & i \\ i & 1 & i & 1 \\ 1 & i & -1 & -i \\ i & 1 & -i & -1 \end{bmatrix} \quad (5a)$$

It should be noted that Mf4 can be used to convert four CP signals into four LP signals, and it can also convert four LP signals into four CP signals. Furthermore, $$\tfrac{1}{4} \cdot Mf4 \cdot Mf4^{*T} = I \quad (5b)$$

Mf4 can be used as a WF muxer and its corresponding WF demuxer will be Mf4*^T. The four resulting wavefronts (WFs) 522a, 522b, 522c, and 522d as depicted in FIG. 5A are orthogonal to each other.

Figure 5C:
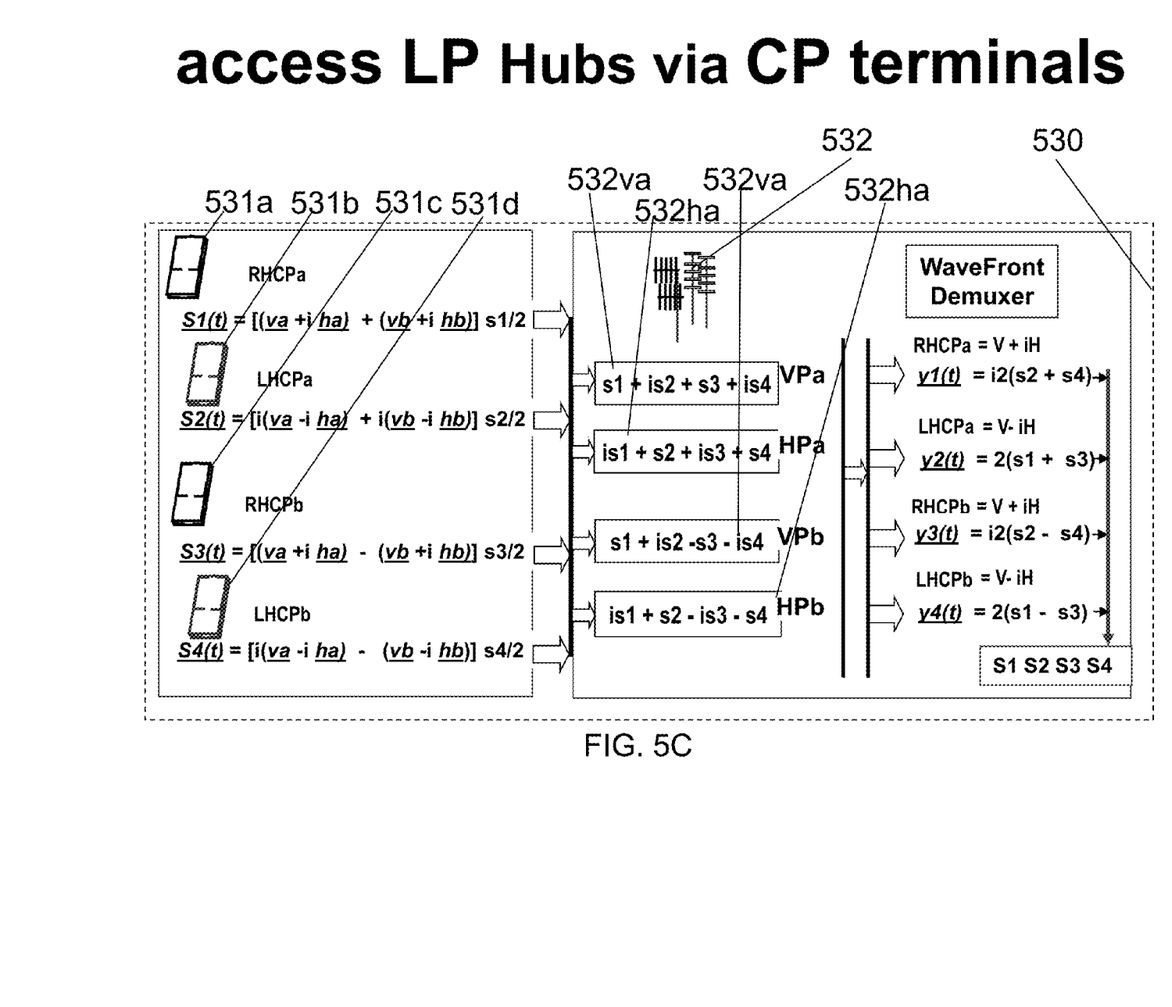

In FIG. 5C 530, we have split the two CP pairs for two common frequency slots; 1 pair of CP at fa and the other pair at fb. Similarly, the two LP pairs are for the same two common frequency slots; 1 pair of LP at fa and the other pair at fb.

S1 is a waveform occupying two RHCP channels, one at fa and the other at fb, carrying signal s1 radiated by terminal-1 531a.

S2 is a waveform occupying two LHCP channels, one at fa and the other at fb, carrying signal s2 radiated by terminal-2 531*b*

S3 is a waveform occupying two RHCP channels, one at fa and the other at fb, carrying signal s3 radiated by terminal-3 531*c*.

S4 is a waveform occupying two LHCP channels, one at fa and the other at fb, carrying signal s4 radiated by terminal-4 531*d*

When these signals arrive at a LP satellite 532, the 4 LP channels will feature the following aggregated signals:

VP channel at fa 532*va*: s1+is2+s3+is4
HP channel at fa 532*ha*: is1+s2+is3+s4
VP channel at fb 532*vb*: s1+i s2−s3−is4
HP channel at fb 532*hb*; is1+s2−is3−s4

When these signals captured by LP hub 532, the channels will feature the following aggregated signals, assuming the amplitude attenuations and phase delays among the 4 propagation channels are identical, where RHCP channel at fa: y1(t)=is2+is4
LHCP channel at fa: y2(t)=s1+s3
RHCP channel at fb: y3(t)=is2−is4
LHCP channel at fb: y4(t)=s1−s3

A post processor, not shown, will calculate the s1, s2, s3, and s4 according to the received y1, y2, y3, and y4. In addition, the post processor performs amplitude and phase equalizations among the propagation paths.

The relative phases between the CP components at two frequencies are critical. When the relative geometries among user 531 and hub 532 are fixed, the cumulative phase difference among signals at two separated frequencies propagating from a source 531 to a destination 532 is constant; therefore, the accumulated phase difference is constant. However when a user 531 is drifting relative to hub 532, the phase differences between two signals at two frequencies propagating from user source location 531 to hub 532 will vary accordingly. Additional phase differentials may result from Doppler effects.

At destination 532, four concurrent receiving functions are present: RHCPa, RHCPb, LHCPa, and LHCPb. The associated phase and amplitude differential effects among the 4 propagation channels at different frequencies and polarizations must be continuously calibrated and equalized to assure orthogonality among multiple WFs when they arrive at destination 532.

Figure 5D:
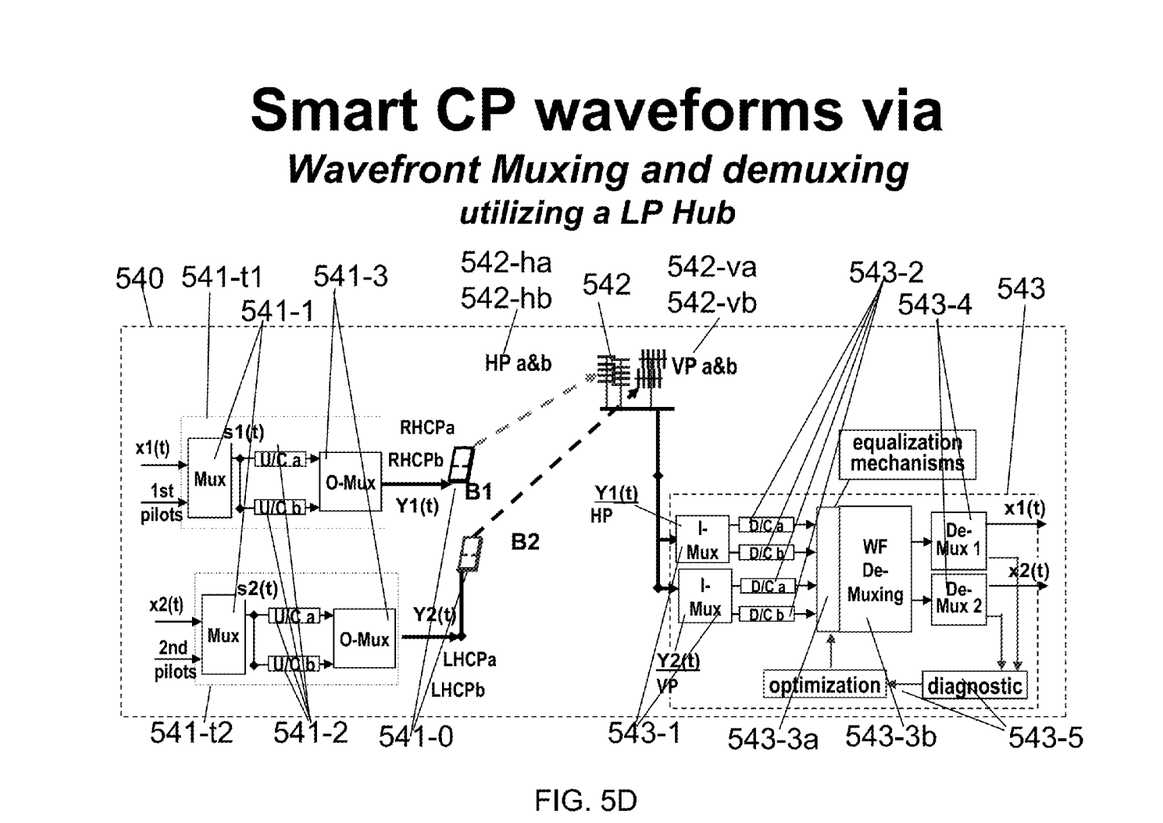

FIG. 5D 540 illustrates a simplified block diagram for an implementation technique for FIG. 5C. Standard low-noise amplifiers (LNAs) and high power amplifiers (HPAs) are not presently shown. 540 depicts top level implementation concepts for the hub 532 as well as two 531*a* and 531*b* of the four users 531. Terminal 541-*t*1 for user 531*a* features transmissions of an identical signal stream s1 via two RHCP channels at fa and fb simultaneously. Embedded pilots for diagnostics are multiplexed 541-1 with a transmission stream x1(t). The mux processing may be a standard technique such as TDM, FDM, or CDM for minimizing bandwidth assets dedicated to probe signals. This in turn supports optimization loop 543-5 at the destination. The muxed signals are frequency up-converted 541-2 to two predetermined frequency slots before joining by a FDM output mux 541-3. The muxed signals are amplified and radiated by antenna 541-0 to designated hub 542.

Similarly, terminal 541-*t*2 for user 531*b* features transmissions of another identical signal stream s2 via two LHCP channels at fa and fb simultaneously. Embedded pilot signals for diagnostic purposes are multiplexed 541-1 with a transmission stream x1(t). The mux processing may be a standard technique such as TDM, FDM, or CDM minimizing bandwidth assets dedicated to probe signals. This in turn supports optimization loop 543-5 at the destination. The muxed signals are frequency up-converted 541-2 to two predetermined frequency slots before joining by a FDM output mux 541-3. The muxed signals are amplified and radiated by antenna 541-0 to designated communications hub 542.

Hub 542 provides two pairs of LP communications channels: the inputs for the first ones 542-*ha* and 542-*va* are at fa, and those for the other set 542-*hb* and 542-*vb* are at fb. The corresponding output frequencies are at fa' and fb', respectively.

At destination 543, antenna 543-0 features independent RHCP and LHCP ports. The received RHCP signals Y1(t) and LHCP signals Y2(t) are conditioned (amplified and filtered), FDM de-muxed 543-1 and frequency down converted 543-2, then fed into electronic filters 543-3*a* as equalization mechanisms before WF demuxing processor 543-3*b*. The WF demuxer 543-3*b* features 4 output ports dedicated for users 531.

The corresponding outputs are de-muxed 543-4 separating desired signals x1(t), x2(t) from probe signals. The recovered probing signals are used by the optimization loop 543-5 as diagnostic signals to equalize phase and amplitude differentials among multiple paths for orthogonal WF reconstructions.

Figure 6:
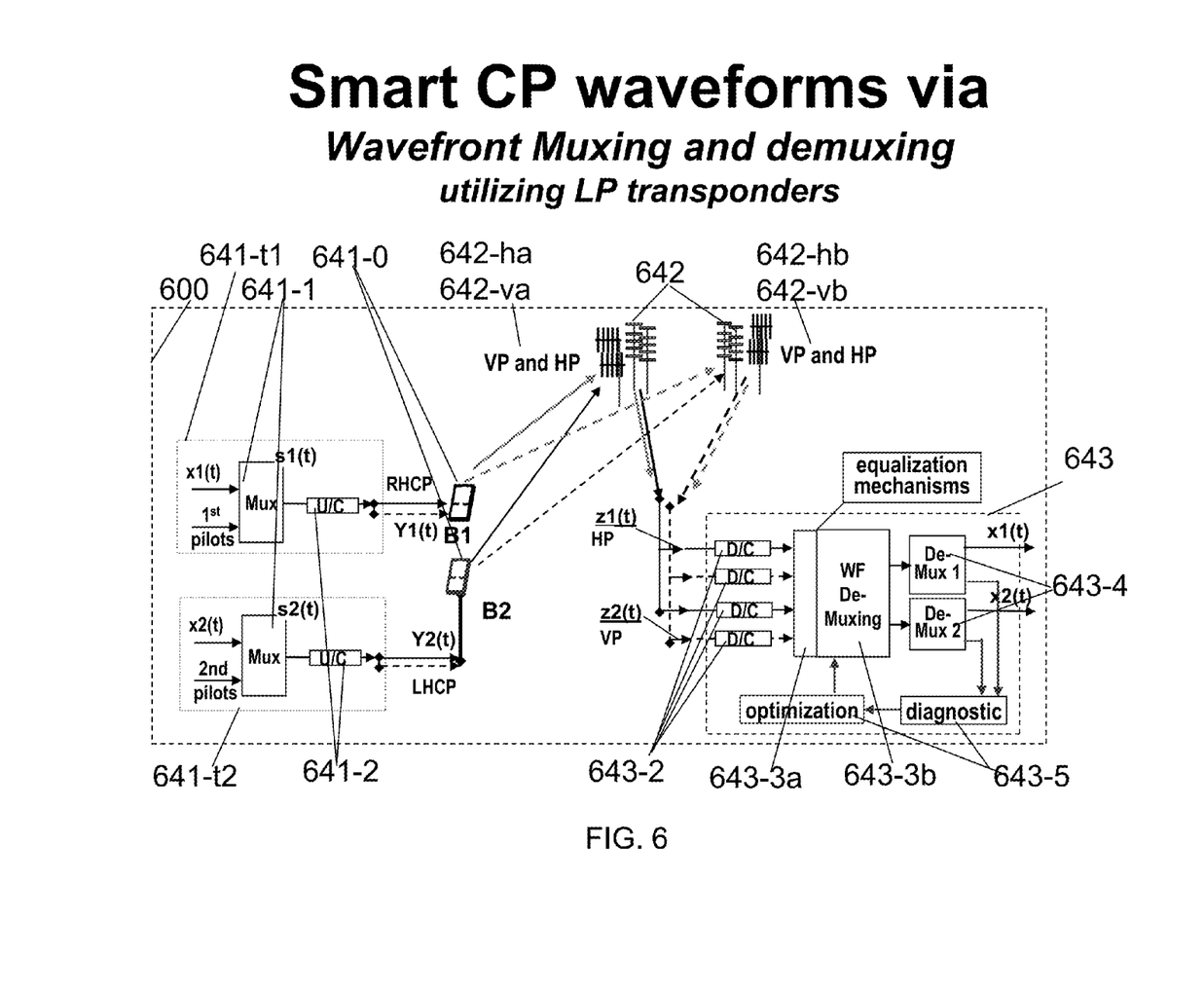
FIG. 6 illustrates a simplified block diagram for implementation of technique as shown in FIG. 5D, for scenarios with multiple LP channels in two hubs at a common frequency slot, instead of multiple LP channels in two common frequency slots in a hub. Standard low-noise amplifiers (LNAs) and high power amplifiers (HPAs) are not shown. Diagnostic signals (pilots) are imbedded to equalize phase and amplitude differentials among multiple paths for orthogonal WF reconstructions.

FIG. 6 600 illustrates a simplified block diagram of an implementation technique similar to for FIG. 5D, specifically for scenarios that utilize multiple LP channels in two satellites 642 at a common frequency slot. Standard low-noise amplifiers (LNAs) and high power amplifiers (HPAs) are not shown. Diagnostic signals (pilots) are imbedded to equalize phase and amplitude differentials among multiple paths for orthogonal WF reconstructions.

Terminal 641-*t*1 for a user 531*a* features transmissions of an identical signal stream s1 via two RHCP channels at fa via two communications hubs concurrently covering a common service area. Embedded pilots for diagnostics are multiplexed 641-1 with a transmission stream x1(t). The mux processing may be a standard technique such as TDM, FDM, or CDM minimizing bandwidth assets dedicated to probe signals. this in turn supports optimization loop 643-5 at the destination. The muxed signals are frequency up-converted 641-2 to a predetermined frequency slot, amplified, power split into two signal paths, then individually radiated by antenna 641-0 to two designated satellites 642.

Similarly, terminal 641-*t*2 for a user 531*b* features transmissions of another identical signal stream s2 via two LHCP channels at fa via two communications hubs simultaneously. Embedded pilots for diagnostics are multiplexed 641-1 with a transmission stream x2(t). The mux processing may be a standard technique such as TDM, FDM, or CDM minimizing bandwidth assets dedicated to probe signals which support the optimization loop 643-5 at the destination. The muxed signals are frequency up-converted 641-2 to a predetermined frequency slot, amplified, divided into two paths and then radiated by a multi-beam antenna 641-0 to the two designated satellite 642.

Selected communications hubs 642 provide two pairs of LP channels: the inputs for channels 642-*ha* and 642-*va* are at hub-1, inputs for channels 642-*hb* and 642-*vb* are at the second hub. The corresponding output frequencies are at fa' and fb', respectively.

At destination 643, multi-beam antenna 643-0 features independent RHCP and LHCP ports aiming at both hubs. The two received RHCP signals Y1(t), Y3(t) and two Rx LHCP signals Y2(t) and Y4(t) are conditioned (amplified and filtered) and frequency down-converted 643-2, then fed into electronic filters 643-3a as equalization mechanisms before the WF demuxing processor 643-3b. The WF demuxer 643-3b features 4 output ports dedicated for users 531.

The corresponding outputs are de-muxed 643-4, separating desired signals x1(t), x2(t) and two sets of probe signals. The recovered probing signals are used by the optimization loop 543-5 as diagnostic signals to equalize phase and amplitude differentials among multiple paths for orthogonal WF reconstructions.

What is claimed is:

1. A system for wireless communications configured to form a first linearly-polarized communications channel and a second linearly-polarized communications channel arranged in parallel with said first linearly-polarized communications channel, wherein said first and second linearly-polarized communications channels are configured to relay first data from a first circularly-polarized portable device, wherein said first linearly-polarized communications channel is configured to transmit a first combination associated with said first data, and said second linearly-polarized communications channel is configured to transmit a second combination associated with said first data, wherein said first linearly-polarized communications channel utilizes a polarization different from one said second linearly-polarized communications channel utilizes.

2. The system of claim 1, wherein said first and second linearly-polarized communications channels are configured to relay said first data from said first circularly-polarized portable device configured to utilize right-hand circular polarization (RHCP).

3. The system of claim 1 further configured to reconstruct said first data based on said first and second combinations transmitted respectively by said first and second linearly-polarized communications channels.

4. The system of claim 1, wherein said first and second linearly-polarized communications channels are configured to relay second data from a second circularly-polarized portable device, wherein said first combination is further associated with said second data, and said second combination is further associated with said second data.

5. The system of claim 4 further configured to reconstruct said first and second data based on said first and second combinations transmitted respectively by said first and second linearly-polarized communications channels.

6. The system of claim 4, wherein said first and second linearly-polarized communications channels are configured to relay said first data from said first circularly-polarized portable device configured to utilize right-hand circular polarization (RHCP), and said first and second linearly-polarized communications channels are configured to relay said second data from said second circularly-polarized portable device configured to utilize left-hand circular polarization (LHCP).

7. The system of claim 4, wherein said first and second linearly-polarized communications channels are configured to relay said first data at a common frequency slot from said first circularly-polarized portable device and to relay said second data at said common frequency slot from said second circularly-polarized portable device.

8. The system of claim 4, wherein said first combination comprises a linear combination of said first and second data.

9. The system of claim 8, wherein said second combination comprises another linear combination of said first and second data.

10. The system of claim 1, wherein said first combination comprises a combination associated with said first data weighted by a complex number.

11. The system of claim 1 further configured to equalize amplitude and phase effects of said first and second linearly-polarized communications channels.

12. The system of claim 1, wherein said first linearly-polarized communications channel utilizes horizontal polarization, and said second linearly-polarized communications channel utilizes vertical polarization.

13. The system of claim 1, wherein said first linearly-polarized communications channel is configured to transmit said first combination associated with said first data at a common frequency slot, and said second linearly-polarized communications channel is configured to transmit said second combination associated with said first data at said common frequency slot.

14. A system for wireless communications configured to form a first communications channel at a first frequency slot and a second communications channel at a second frequency slot different from said first frequency slot, wherein said second communications channel is arranged in parallel with said first communications channel, wherein said first and second communications channels are configured to relay first data from a first portable device, wherein said first communications channel is configured to transmit a first combination associated with said first data, and said second communications channel is configured to transmit a second combination associated with said first data.

15. The system of claim 14, wherein said first communications channel utilizes horizontal polarization, and said second communications channel utilizes vertical polarization.

16. The system of claim 14, wherein both of said first and second communications channels utilizes horizontal polarization.

17. The system of claim 14, wherein both of said first and second communications channels utilizes vertical polarization.

18. The system of claim 14, wherein said first and second communications channels are configured to relay second data from a second portable device, wherein said first combination is further associated with said second data, and said second combination is further associated with said second data.

19. The system of claim 18, wherein said first combination comprises a linear combination of said first and second data.

20. The system of claim 14 further configured to reconstruct said first data based on said first and second combinations transmitted respectively by said first and second communications channels.

* * * * *